United States Patent [19]

Yoshikawa et al.

[11] 4,198,369

[45] Apr. 15, 1980

[54] PROCESS FOR LINING CONTAINER CAPS

[75] Inventors: Tetsuo Yoshikawa, Katsuta; Shinzi Hayata, Yamaguchi; Yutaka Hirota, Mitaka, all of Japan

[73] Assignees: Mitsui Petrochemical Industries Ltd.; Hi-Sheet Industries Ltd., both of Tokyo, Japan

[21] Appl. No.: 3,541

[22] Filed: Jan. 15, 1979

Related U.S. Application Data

[63] Continuation of Ser. No. 765,351, Feb. 3, 1977, abandoned.

[30] Foreign Application Priority Data

Feb. 9, 1976 [JP] Japan .................................. 51-12367

[51] Int. Cl.² .......................... B29C 1/14; B29C 13/02
[52] U.S. Cl. ..................................... 264/268; 215/341; 427/375; 427/236
[58] Field of Search ................ 215/341, 349; 264/268, 264/DIG. 67; 427/236, 237, 238, 379, 230, 375

[56] References Cited

U.S. PATENT DOCUMENTS

| | | | |
|---|---|---|---|
| 3,164,485 | 1/1965 | Nagle | 215/341 X |
| 3,539,480 | 11/1970 | Groff | 220/64 |
| 3,716,400 | 2/1973 | Tryzna | 220/64 |
| 3,904,795 | 9/1975 | Merurio | 427/375 |
| 4,007,306 | 2/1977 | Poy | 427/379 |
| 4,068,776 | 1/1978 | Wazolek | 428/64 |
| 4,140,742 | 2/1979 | Fisher | 264/268 |

FOREIGN PATENT DOCUMENTS

1112025  5/1968  United Kingdom ..................... 264/268

*Primary Examiner*—Sam Silverberg
*Attorney, Agent, or Firm*—Sherman & Shalloway

[57] ABSTRACT

A process for lining container caps, which comprises applying a dispersion in an aqueous medium of an olefin resin to the inner bottom surface of a cap shell, subjecting the aqueous dispersion applied to a first-step heat treatment at a temperature below the thermo-forming temperature of the olefin resin, and then subjecting it to a second-step heat treatment at a temperature not lower than the thermo-forming temperature of the resin but below the heat decomposition temperature of the resin.

9 Claims, No Drawings

PROCESS FOR LINING CONTAINER CAPS

This is a continuation of application Ser. No. 765,351, filed Feb. 3, 1977, now abandoned.

This invention relates to a process for lining or packing (to be referred to generically as "lining") container caps such as crown caps, screw caps or tearoff caps by applying a liner, gasket or packing (to be referred to generically as a "liner") to the inner bottom surfaces of cap shells. More specifically, the invention relates to a process for lining container caps, which comprises applying an aqueous dispersion of an olefin resin to the inner bottom surface of a cap shell, heat-treating it at a temperature below the thermo-forming temperature of the resin (first-step heat treatment), and then heat-treating it at a temperature not lower than the thermo-forming temperature of the resin (second-step heat treatment).

Cork liners have been utilized from old for lining container caps. However, since cork is of natural origin, its use is limited in many ways with regard, for example, to its supply and processing, and also has the disadvantage that cork tends to generate dust during hoppering, or to drop off during use. Moreover, when a pinhole occurs in the inner coated layer of a cap shell, cork forms tannin iron and turns black. In an attempt to replace the natural cork, a plastisol consisting of a paste-like dispersion of a vinyl chloride resin powder in an involatile plasticizer, which will be gelled by heat-treatment to form a liner, has been developed and gained commercial acceptance. In such a plastisol-type liner, however, the toxicity of plasticizers and residual monomers in the resins has posed a problem, and container cap liners free from such a trouble have been desired.

We made extensive investigations in an attempt to provide a cap lining process which retains the advantages of the plastisol-based cap lining process and which can afford satisfactory liners by an easy operation and can obviate the toxicity problem associated with the use of plastisols. These investigations led to the discovery that a dispersion in an aqueous medium of an olefin resin not suggested heretofore for lining container caps can be utilized, and that container cap liners of superior quality can be formed by an easy operation based on the two-step heat treatment of the aqueous dispersion of olefin resin at specific temperatures. We have also found that the use of such an aqueous dispersion of olefin resin can solve the toxicity problem associated with plastisols, and that container caps lined by the process of this invention has superior sealing properties and superior resistances to pressure elevation and reduction.

It is an object of this invention therefore to provide an improved process for lining container caps which has overcome the disadvantages of plastisol liners.

The above and other objects and advantages of this invention will become more apparent from the following description.

According to the process of this invention, a dispersion in an aqueous medium of an olefin resin not suggested heretofore for use in cap lining is used as a liner-forming material to be applied to the inner bottom surface of a cap shell. The resin layer applied is subjected to first-step heat treatment at a temperature below the thermo-forming temperature of the olefin resin in order to remove the volatile aqueous medium (e.g., water or a mixture of water and an organic solvent) by evaporation. It is then subjected to second-step heat treatment at a temperature not lower than the thermo-forming temperature in order to melt the olefin resin particles and to form a uniform film or sheet adhering to the inner bottom surface of the cap shell.

The "thermo-forming temperature", as used herein, denotes the softening point (in the case of an amorphous resin) or the melting point (in the case of a crystalline resin) of the resin in the aqueous dispersion. Where two or more olefin resins are used together, the thermo-forming temperature refers to the softening point or melting point of a resin which softens or melts at the highest temperature.

The first-step heat treatment at a temperature below the thermo-forming temperature, as used herein, is also meant to include heat treatment using heating means which yield heat exceeding the thermo-forming temperature, if the temperature of the resin particles in the aqueous dispersion is below the thermo-forming temperature. For example, when an aqueous dispersion of high-pressure polyethylene having a softening point of 100° C. is subjected to first-step heat treatment, temperatures above 100° C., say 120° C., may be employed if the temperature of the resin particles is below 100° C. during the heat treatment.

The term "olefin resin", as used in the present application, denotes olefinic plastics, rubbers, elastomers, and thermoplastic elastomers.

Preferably, the aqueous dispersion used in the present invention is prepared by dispersing the following olefin resins in an aqueous medium in the presence or absence of a surface-active agent.

(1) 50 to 90 parts by weight of a film-forming olefin resin having an intrinsic viscosity ($\eta$) (calculated from its reduced viscosity measured in a decalin solution at 135° C.) of not more than 20 and an acid value (the amount in milligrams of KOH required to neutralize 1 gram of the olefin resin) of not more than 5, and (2) 50 to 1 part by weight of a modified olefin resin containing a carboxyl group or a carboxyl-forming group and having an intrinsic viscosity of 0.04 to 1.50 and an acid value of 10 to 150.

Three preferred embodiments by utility and the use of surfactants are described below.

Where the aqueous dispersion of an olefin resin is used to line caps of food containers, it is desirable not to use a surface-active agent in preparing the aqueous dispersion. An aqueous dispersion of fine spherical olefin resin particles having resistance to phase separation without the use of a surface-active agent can be prepared, for example, by melting an olefin resin composition consisting of 50 to 99 parts by weight of a film-forming olefin resin having an intrinsic viscosity ($\eta$) (calculated from its reduced viscosity measured in a decalin solution at 135° C.) of not more than 5, preferably 0.1 to 3, and 50 to 1 part by weight of a modified olefin resin containing a carboxyl group or a carboxyl-forming group and having an intrinsic viscosity ($\eta$) of 0.04 to 1, preferably 0.06 to 0.8 and an acid value (the amount in milligrams of KOH required to neutralize 1 gram of the modified olefin resin) of 30 to 150, preferably 50 to 130; adding the molten olefin resin composition to water which contains a basic substance in an amount of generally at least 0.2 chemical equivalent, preferably 0.3 to 1.0 chemical equivalent to the carboxyl group or the carboxyl-forming group of the composition and is heated at a temperature above the melting point of a component of the composition which has a higher melting point, for example, at 140°–300° C.; and then dispersing the composition using a high performance dispersing means preferably having a high shear force, such as a colloid mill, homomixer, or turbine-type stirrer.

The addition of a basic substance is required in order to secure the long-term storability of the resulting aqueous dispersion of olefin resin. It can be omitted when the dispersion is to be used soon after preparation, or the dispersed state is good and can be so maintained for about a week. Examples of such a basic substance are alkaline metals, alkaline earth metals, ammonia, amines and oxides, hydroxides, weak acid salts, hydrides, and alcoholates of alkali metals and alkaline earth metals. All of these compounds act as bases in water.

For use in lining caps of non-foodstuff containers, the aqueous dispersion of an olefin resin may be prepared by using a surface-active agent. If the amount of the surfactant is large, it remains in a large amount in a film of the olefin resin obtained by evaporating water from the aqueous dispersion. Thus, it impairs the physical properties of the film, and sometimes, renders the film water-soluble. Accordingly, the amount of the surfactant should preferably be minimized in this case also. An example of such an aqueous dispersion of an olefin resin is described in Japanese Laid-open Patent Publication No. 36540/75. It is an olefin resin composition having an acid value of 1 to 10 and consisting of a mixture of an olefin resin having an acid value of not more than 5 and an intrinsic viscosity ($\eta$) of 0.04 to 20, preferably 0.1 to 3, a modified olefin resin containing as a binder component an ethylenically unsaturated carboxylic acid or its derivative and having an acid value of 10 to 150, preferably 50 to 130 and an intrinsic viscosity ($\eta$) of 0.04 to 1.50, preferably 0.06 to 0.8, and a surface-active agent. The resin particles in this aqueous dispersion have good dispersibility even when the amount of the surfactant is not more than 10% by weight of the olefin resin composition, and the composition has good water resistance.

Furthermore, an aqueous dispersion of spherical particles of an olefin resin having a particle diameter of about 1 to 5 microns can be prepared by mixing an olefin resin having an intrinsic viscosity ($\eta$) of 0.1 to 5.0, a carboxyl-containing modified olefin resin and/or a mon-ionic surface-active agent having an HLB value (hydrophilic-lipophilic balance) of 1 to 5, an organic solvent such as hexane, and water at a temperature above the temperature at which the olefin resins are dissolved in the organic solvent; cooling the mixture at a temperature below the temperature at which the olefin resin is precipitated to form an emulsion; removing a part of the organic solvent; adding an anionic surface-active agent or a nonionic surface-active agent having an HLB value of 10 to 16; and removing the remainder of the organic solvent.

Of the aqueous dispersions of olefin resins exemplified above as suitable for use in the process of this invention, an especially preferred species is a dispersion in an aqueous medium of a mixture consisting of an olefin resin, preferably polyethylene, an ethylene/vinyl acetate copolymer, an ethylene/propylene copolymer, an ethylene/butene-1 copolymer, propylene/butene-1 copolymer, or a mixture of at least two of these polymers, and a modified olefin resin containing a carboxyl group or a carboxyl-forming group.

Examples of suitable olefin resins for use in the process of this invention are homo- or copolymers of 1-olefins preferably containing 2 to 7 carbon atoms, copolymers (inclusive of block or graft copolymers) of these 1-olefins with conjugated or non-conjugated dienes, copolymers (inclusive of block or graft copolymers) of these 1-olefins and vinyl acetate, complete or partial saponification product of the vinyl acetate copolymers, mixtures of these homopolymers or copolymers, and modification products of these resins. Specific examples include polyethylene, polypropylene, polybutene-1, poly(4-methyl-1-pentene), an ethylene/propylene copolymer, and ethylene/butene-1 copolymer, a propylene/butene-1 copolymer, an isobutene/isoprene copolymer, an ethylene/butadiene copolymer, an ethylene/ethylidenenorbornene copolymer, an ethylene/propylene/butadiene copolymer, an ethylene/propylene/dicyclopentadiene copolymer, an ethylene/propylene/ethylidenenorbornene copolymer, an ethylene/propylene/1,5-hexadiene copolymer, an ethylene/vinyl acetate copolymer, and a complete or partial saponification product of the vinyl acetate copolymer.

Suitable modified olefin resins containing a carboxyl group or a carboxyl-forming group typified by an acid hydride group and an ester group include, for example, copolymers of the aforesaid 1-olefins with $\alpha,\beta$-unsaturated carboxylic acids or acid anhydrides thereof, complete or partial saponification product of copolymers of 1-olefins with esters, amides or imides of $\alpha,\beta$-unsaturated carboxylic acids, graft copolymers obtained by grafting $\alpha,\beta$-unsaturated carboxylic acids to polyolefins, complete or partial saponification products of graft copolymers obtained by grafting esters, amides or imides of $\alpha,\beta$-unsaturated carboxylic acids to polyolefins, and polyolefins subjected to oxidation treatment for formation of carboxyl groups.

The $\alpha,\beta$-unsaturated carboxylic acids may be mono- or di-carboxylic acids which include, for example, aliphatic monocarboxylic acids containing not more than 6 carbon atoms, preferably not more than 4 carbon atoms, such as acrylic acid, methacrylic acid, crotonic acid, or isocrotonic acid, aliphatic dicarboxylic acids such as maleic acid, fumaric acid, mesaconic acid, citraconic acid or itaconic acid, 5-norbornene-2,3-dicarboxylic acid, its nuclear methyl substituted product, and its derivative resulting from the halogen-substitution of its endomethylene group. These carboxylic acids can also be used in the form of anhydrides (e.g., maleic anhydride).

Olefin resins modified with these $\alpha,\beta$-unsaturated carboxylic acids or acid anhydrides thereof generally have an intrinsic viscosity ($\eta$) of 0.04 to 1, preferably 0.06 to 0.8, and desirably have an acid value of generally 30 to 150, preferably 50 to 130. If the acid value is too low, there is no appreciable effect of blending such a modified resin. On the other hand, if it is too high, the olefin resin becomes hydrophilic and dissolves in water, and therefore, the effect of blending it does not last. In order to produce a proper blending effect of the modified olefin resin, it is preferred to use it in an amount of about 1 to 50 parts by weight per 100 parts by weight of the olefin resin composition.

The properties of a liner formed from the aqueous dispersion of an olefin resin used in the process of this invention are most affected by the properties of the resin. Preferably, the resin is so selected that the surface of the liner has a proper hardness. It is preferred that the liner have a spring hardness (Shore A) measured in accordance with JIS-K6301 (20° C.), or ASTM D2240-68T, of about 30 to about 95. Liners having such a surface hardness can be directly prepared from the aqueous dispersions of olefin resins shown in the aforementioned embodiments by selecting the kinds of the olefin resins. Or they can be produced by adding a blowing agent to the aqueous dispersion of olefin resin and expansion-molding the mixture to control the surface hardness. When a relatively hard resin is selected from the viewpoint of tensile strength, heat resistance and compression resistance, a liner having softness and cushioning property suitable for use as a container closure liner having a low sealing load can be obtained by expansion-molding.

If desired, the aqueous dispersion of an olefin resin used in the process of this invention may contain various additives. Examples of the additives are fillers such as calcium carbonate, finely divided silica, alumina, magnesium oxide, clay, kaolin, bentonite, talc, diatomaceous earth, crystalline cellulose powder, starch, or synthetic resin powder; pigments such as titanium oxide, or carbon black; cross-linking agents such as dicumyl peroxide, or ditertiary butyl peroxide; slip agents such as silicone, paraffin wax, wax, polyethylene wax, or fatty acid amides; antioxidants; heat deterioration inhibitors; and natrual resins such as rosin, rosin esters, or terpene resins. The amounts of these additives can be properly chosen, and for example, about 0.01 to about 30 parts by weight of fillers, about 0.001 to about 2 parts by weight of pigments, about 0.01 to about 3 parts by weight of crosslinking agents, and about 0.01 to about 10 parts by weight of slip agents and natural resins can be used per 100 parts by weight of the olefin resin (solids content).

With certain forms of container closures, for example, with screw caps or pilfer-proof caps, the frictional resistance between the liner and the container mouth is high, and it is difficult to open the cap. In such a case, the addition of a filler and a slip agent to the aqueous dispersion of olefin resin is effective. Similar effects can be expected by adding polymers of different types from the base polymers in the aqueous dispersion, especially polymers having a higher melting point than the base polymers. For example, where low-density polyethylene or an ethylene/vinyl acetate copolymer is a base polymer, it is preferred to add polypropylene, poly(4-methyl-1-pentene), high-density polyethylene, or a fluorocarbon resin to the base polymer in an amount of about 0.1 to 10 parts by weight per 100 parts by weight of the base polymer.

Furthermore, a blowing agent may be added to the aqueous dispersion of olefin resin. Examples of the blowing agent are azodicarbonamide, N,N'-dinitrosopentamethylene tetramine, and p.p'-oxybis-benzenesulfonyl hydrazide. When the aqueous dispersion of olefin resin is likely to give a liner having a spring hardness, measured in accordance with JIS-K 6301(20° C.) or ASTM D2240-68T, of at least about 95, a foaming agent is preferably added to adjust the hardness to about 30–95. This will result in an increased sealing effect of the liner formed. The control of the surface hardness by adding blowing agents can impart sufficient compressibility (cushioning property), elasticity and flexibility to the foamed liner so as to produce a sufficient sealing effect without breakage of the container between the upper edge portion of the container mouth and the inner bottom of the container cap. As a result, sufficient sealing can be secured between the mouth of the container and the container cap. Preferably, the blowing agent has a decomposition temperature of at least about 130° C., preferably about 150° to about 210° C. The amount of the blowing agent is not critical, but is preferably about 0.1 to about 5% by weight, more preferably about 0.2 to about 1% by weight, per 100 parts by weight of the resin solids. When the aqueous dispersion contains a blowing agent, heating of the blowing agent to the decomposition temperature is preferably effected by the second-step heat treatment. It is preferred therefore that the blowing agent have a decomposition point above the thermo-forming temperature of the olefin resin but below the heat decomposition temperature of the resins.

In order to obtain a satisfactory foamed structure, the decomposition temperature of the blowing agent must coincide with the melting temperature suitable for foaming the resin composition. For this purpose, a blowing promoter, such as metal soaps (e.g., calcium stearate and zinc stearate), organic acids (e.g., oxalic acid and citric acid), and metal oxides (e.g., zinc oxide), may be added in an amount of about 0.1 to 5% by weight, preferably 0.2 to 1% by weight, based on the resin solids.

Formation of a foamed liner can also be performed in the absence of a blowing agent. For example, the foaming effect can be obtained by performing the first-step heat treatment so that about 10% by weight, preferably about 0.5 to about 5% by weight, of the aqueous medium in the aqueous dispersion before the first-step heat treatment is left, and then performing the second-step heat treatment to produce a foaming effect by the remaining aqueous medium.

The suitable viscosity of the aqueous dispersion of an olefin resin with or without additives can be determined according to the structure of a container cap, the shape of a liner to be formed, and the structure and operability of a device for applying the dispersion to the inner bottom surface of the cap shell. Usually, the viscosity of the aqueous dispersion is conveniently about 10 to about 100,000 centipoises, preferably about 500 to about 35,000 centipoises, measured by a Brookfield type viscometer (rotating speed of 60 rpm, 25° C.; the other conditions are in accordance with ASTM D1076; to be referred to as "B type viscosity"). When the entire inner bottom surface of a cap shell is smooth and a disc-like liner is to be formed, or when a side groove is present around the bottom of a cap shell and an annular liner is to be formed, the aqueous dispersion preferably has as low a viscosity as possible, usually about 800 to about 5,000 centipoises. When the entire inner bottom of the cap shell is smooth and an annular liner is to be formed only around the bottom of the shell, the aqueous dispersion preferably has as high a viscosity as possible, usually about 7,000 to about 25,000. The viscosity of the aqueous dispersion can be adjusted by controlling the solids concentration of the aqueous dispersion and/or by adding a viscosity controller such as natural sizes or aqueous synthetic polymeric thickeners. The synthetic polymeric thickeners also have an action of decreasing the decomposition temperature of the blowing agent.

According to the process of this invention, the aqueous dispersion of olefin resin applied to the inner bottom surface of a container cap is then subjected to a two-step heat treatment consisting of a first-step heat treatment at a temperature below the thermo-forming temperature of the olefin resin, and a second-step heat treatment at a temperature not lower than the thermo-forming temperature of the olefin resin but below its heat decomposition temperature. The first-step heat treatment results in the evaporation of almost the entire portion or a greater part of the aqueous medium (water or water and an organic solvent) in the aqueous dispersion. Usually, at least about 90%, preferably at least about 95% by weight, of the aqueous medium in the aqueous dispersion before the first-step heat treatment is removed. Where it is desired to produce a foaming effect in the second-step heat treatment by leaving a small amount of the aqueous medium in the first-step heat treatment, the presence of the aqueous medium in an amount of up to about 10% by weight, preferably up to about 5% by weight, is permissible. The aqueous dispersion of olefin resin concentrated at the inner bottom surface of the cap shell is subjected to the second-step heat treatment to form a film or sheet of the desired shape adhering to the inner bottom surface of the cap shell. Formation of the liner film or sheet can be facilitated by using a pressurizing means such as a plunger.

Preferably, the inner bottom surface of the container cap shell to which the aqueous dispersion of olefin resin is to be applied is rendered hydrophilic in advance to increase its affinity for the aqueous dispersion. This can be accomplished by known methods such as the application of a primer or treatment of the metal surface itself. Where the amount of the aqueous dispersion to be applied is small, the above treatment to render the bottom surface hydrophilic is especially desirable in order to ensure a uniform application of the aqueous dispersion and formation of a liner of a uniform shape. A mixture of water and a water-miscible organic solvent may be used as the dispersion medium instead of water alone. Examples of such organic solvents are alcohols such as ethanol or isopropyl alcohol, ethers such as diethyl ether or diisopropyl ether, and ketones such as acetone or methyl ethyl ketone. When an aqueous medium composed of water and 0.1 to 100%, based on the weight of water, of such an organic solvent is used, the time required for the first-step heat treatment can be shortened, and moreover, the wettability of the inner bottom surface of the cap shell is improved so that it is no longer necessary to render it hydrophilic beforehand.

The application of the aqueous dispersion of olefin resin to the inner bottom surface of the cap shell, preferably rendered hydrophilic, can be accomplished by any desired means. For example, the aqueous dispersion is poured in suitable amounts from a nozzle under pressure onto the inner bottom surface of the cap shell by utilizing the flowability of the aqueous dispersion. Then, the cap shell is rotated to fill the dispersion uniformly into the inner bottom of the shell by a centrifugal force. The cap shell having applied to its inner bottom surface the aqueous dispersion of olefin resin is then subjected to the first-step heat treatment. The first-step heat treatment is carried out at a temperature below the thermo-forming temperature of olefin resin, preferably from about 60° C. to below the thermo-forming temperature of the olefin resin. If the first-step heat treatment is carried out at a temperature not lower than the thermo-forming temperature (in other words, when a liner is formed in one step under the conditions of the second-step heat treatment in the absence of the first-step heat treatment), the liner or packing obtained shows a poor appearance, contains micropores formed, or only insufficiently adheres to the cap shell. Hence, the liner or packing so obtained cannot have superior impermeability, compressibility, elasticity, dimensional stability, and sealant properties. Accordingly, the first-step heat treatment at a temperature below the thermo-forming temperature is essential in the process of this invention.

In order to shorten the time required to evaporate off the aqueous medium in the first-step heat treatment, the aqueous dispersion may be pre-heated prior to application to the inner bottom of a cap to an extent which does not impair its dispersibility. Or the container closure may be pre-heated. Or the first-step heating temperature is increased as much as possible within the specified temperature range. Moreover, a pressure reducing means may be used for this purpose.

The cap subjected to the first-step heat treatment is then subjected to the second-step heat treatment at a temperature not lower than the thermo-forming temperature. Where the aqueous dispersion contains a blowing agent, the temperature of the second-step heat treatment is above the decomposition temperature of the blowing agent and not lower than the thermo-forming temperature of the olefin resin. During or after the second-step heat treatment when the film formed is still soft, a pressurizing means such as a plunger may be used to assist in the formation of a liner of the desired shape. Since the use of such a means can afford a liner having a larger thickness at its portion contacting the upper edge portion of the container mouth than at its central portion, adhesion between the liner and the upper edge portion is further enhanced. As a result, the use of such a liner produces an increased sealing effect. The same effect can be obtained by forming the liner in an annular form contacting only the upper edge of the mouth of the container.

Any desired heating means can be used in the first and second step heat treatments. For example, a direct heating method using a heating oven and an induction heating method can be used. Heating can be performed in a substantially open condition, or in air or in an atmosphere of an inert gas. The first-step and second-step heating may be performed separately, but it is advantageous to vary the heating temperature in the same step. The thickness of the liner or packing formed can be changed suitably. Generally, the thickness is about 0.3 to 3 mm. The adhesion strength between the liner or packing and the inner bottom surface of the cap shell can be increased by coating a primer or an anchoring agent to the inner bottom surface in advance.

The aqueous dispersion of olefin resins can adhere not only to the inner bottom surface of the cap shell, but also to its inner side surfaces. Sealing is therefore done at the thickness portion and the side portion of the mouth of the container, and the sealing effect is further increased.

The process of this invention is very economical since it can continuously produce a liner or packing material suitable for a variety of container closures such as standard skirt-type or short skirt-type crown caps, screw caps (white caps), tear-off caps, pilfer-proof caps, lug caps, plastic caps, rolled-on caps, and crimped-on caps.

The following Examples and Comparative Examples illustrate the present invention further.

EXAMPLES 1 TO 4

An aqueous dispersion having a solids concentration of about 50% by weight was prepared by using an olefin resin mixture consisting of 80 parts by weight of each of the olefin resins shown in Table 1 and 20 parts by weight of maleic anhydride-grafted polyethylene having an acid value of 45, an intrinsic viscosity ($\eta$) of 0.12 and a melting point of 120° C. At this time, potassium hydroxide was added in an amount of 0.5 chemical equivalent based on the carboxyl group. The resin particles in the aqueous dispersion were spheres with a size of about 2 microns, and the aqueous dispersion had B-type viscosity of 130 centipoises.

As a blowing agent, 0.5 part by weight of azodicarbonamide (decomposition temperature about 200° C.) was added per 100 parts by weight of the resin solids in the aqueous dispersion, and they were uniformly mixed. 0.6 g of the dispersion was filled uniformly into the hydrophilic inside surface of a crown cap (No. 5 standard crown cap in accordance with JIS S-9017), and heated for 30 minutes in a Geer's oven at 80° C. Water was evaporated off by this first step heating.

Then, it was further heated for 4 minutes in a Geer's oven at 230° C. to form a film on the inner bottom surface of the crown cap. This film consisted of a skin layer on the surface and a closed cellular structure in its inside with spherical cells having a uniform size. The properties of the foamed films obtained in these Examples are shown in Table 1.

Table 1

| Example | Olefin resins | | | | Properties of the foamed film | | |
|---|---|---|---|---|---|---|---|
| | Polymer component | Density (g/cc) | ($\eta$) (dl/g) | M 1 (g/10 min.) | Thickness (mm) | Density (g/cc) | Hardness (degrees) |
| 1 | High pressure polyethylene | 0.92 | 1.0 | 23 | 1.5 | 0.60 | 35 |
| 2 | Ethylene/vinyl acetate (14%) copolymer | 0.93 | 1.1 | 15 | 1.5 | 0.60 | 80 |
| 3 | Ethylene/vinyl acetate (6%) copolymer | 0.92 | 0.6 | 70 | 1.4 | 0.65 | 85 |
| 4 | Ethylene/butene-1 copolymer (thermoplastic elastomer) | 0.89 | 0.9 | 20 | 1.5 | 0.60 | 80 |

Test methods

Density: ASTM 792-66; Hardness: ASTM D2240-68T;

Melt Index (M.I.) ASTM D1238

The foamed films had a smooth white surface and well adhered to the inner bottom surface of the crown cap. They exhibited tight-sealing properties as crown cap liners.

The crown caps containing these liners were mounted on bottles. The bottles were filled with water at 20° C., and allowed to stand for 24 hours in a constant-temperature vessel at 50° C. to perform a water leakage test (JIS S-9017-1957). No water leakage was observed in either case.

Bottles having a capacity of 210 cc were each charged with 200 cc of dilute sulfuric acid and then with sodium bicarbonate wrapped with paper in an amount sufficient to generate 840 cc of carbon dioxide gas. They were then sealed with each of the crown caps containing these liners, and carbon dioxide gas was generated. The bottles were dipped for 1 hour in warm water at 65° C., and gas leakage was examined (the continued pressure resistance test in accordance with JIS S-9017-1957). In either case, no gas leakage was observed.

Hot water at more than 95° C. was poured into bottles each having a capacity of 210 cc, and the bottles were sealed with each of the crown caps having these liners. The bottles were allowed to stand for 24 hours at a temperature of 2°, 20°, and 40° C., respectively. The pressures inside the bottles were measured by a vacuum test gauge (the continued pressure reduction resistance test in accordance with JIS-S-9017-1957), and found to be more than 400 mmHg in either case. No trouble was seen. Even after standing for one month further, no change in the degree of pressure reduction was seen.

Then, the bottles were each connected to a source of supplying compressed air, and the pressure at which the liner was broken (that is, the minimum pressure at which air leaked from the bottle) was measured (instantaneous pressure resistance test). The pressures measured were more than 13 kg/cm$^2$ in all cases showing superior sealing properties.

COMPARATIVE EXAMPLES 1 TO 4

When the first-step heat treatment was not performed but the dispersion applied was heated for 8 minutes in a Geer's oven at 230° C. in the procedure of Examples 1 to 4, the resulting foamed films had a nonuniform shape, and did not have sealing properties.

EXAMPLE 5

A liner was formed on the inner bottom surface of a crown cap in the same way as in Examples 1 to 4 using an aqueous dispersion having a solids concentration of 50% by weight and prepared from 80 parts by weight of high-pressure polyethylene (density 0.92 g/cc, [$\eta$] 0.6, M.I. 70 g/10 minutes), 20 parts by weight of maleic anhydride-modified polyethylene (acid value 55, intrinsic viscosity 0.1, melting point 120° C.), polyoxyethylene sorbitan dioleaete as a surface-active agent, and potassium hydroxide. A film having good sealant properties as a crown cap liner was obtained. The film had a skin layer at its surface and a closed cellular structure of spherical cells with a uniform size inside. The film had a thickness of 1.5 mm, a density of 0.60 g/cc, and a hardness of 85.

EXAMPLES 6 AND 7

Aqueous dispersions were prepared in the same way as in Examples 1 to 4 using 80 parts of olefin resins shown in Table 2 and 20 parts of maleic anhydride-grafted polyethylene (acid value 45, [$\eta$] 0.12, melting point 120° C.). The resulting aqueous dispersions had a B-type viscosity of 200 centipoises. 0.8 g of each of the aqueous dispersion (resin concentration 50%) was filled uniformly into the inside of a crown cap, and heated in two steps in the same way as in Examples 1 to 4. The films adhered to the inner bottom surfaces of crowns had a smooth surface and were transparent with no cells inside. The properties of these films are shown in Table 2.

Crown caps having these liners were mounted on bottles, and subjected to the same sealability tests as set forth in Examples 1 to 4. No undesirable change was observed in either case.

Each of the resulting aqueous dispersions was poured into a cap, and heated first for 5 minutes in an infrared heater at 120° C., and then for 1.5 minutes in an infrared heater at 210° C. The surface of the resulting packing was smoothed by stamping it with a Teflon former. In either case, a gray foamed structure with an expansion factor of about 2 which had a surface skin layer and closed spherical cells with a uniform size inside was Table 2

| Example | Olefin resins Polymer component | Density (g/cc) | ($\eta$) (dl/g) | M.I. (g/10 min.) | Properties of the film Thickness (mm) | Density (g/cc) | Hardness (degree) |
|---|---|---|---|---|---|---|---|
| 6 | 60 wt % of high pressure polyethylene (density 0.92, M.I. 70) and 40 wt % ethylene (80%)/propylene copolymer | 0.90 | 0.7 | 14 | 1.0 | 0.90 | 85 |
| 7 | Ethylene/vinyl acetate (19%) copolymer | 0.94 | 0.55 | 150 | 1.0 | 0.94 | 88 |

Mooney viscosity $ML_{1-4}$ (100° C. = 20)

COMPARATIVE EXAMPLES 5 AND 6

When in the procedure of Examples 6 and 7, the first-step heating was not performed, but the aqueous dispersion applied was heated for 8 minutes in a Geer's oven at 230° C., the resulting films had extremely non-uniform shapes, were of bad quality, and contained foam cells. Because of this, the films did not have sealing properties.

EXAMPLE 8

An aqueous dispersion (solids concentration 49%, by weight, B type viscosity 1,000 centipoises) was prepared in the same way as in Example 1 from 95 parts of an ethylene/vinyl acetate (6% by weight) copolymer (melt index 70 g/10 minutes, [$\eta$] 0.6, density 0.92 g/cc) and 5 parts by weight of maleic anhydride-grafted polyethylene (acid value 55, intrinsic viscosity [$\eta$] 0.1, melting point 120° C.). 0.8 g of the resulting dispersion was poured into the inside of a crown cap, and heated for 8 minutes in an oven at 100° C. After heating, about 4% by weight of water still remained. Then, it was heated for 2 minutes by an infrared heater at 210° C. The resulting liner was a foamed structure of low expansion factor containing a surface skin layer and having a density of 0.75 g/cc and a hardness of 86. The sealing properties of the liner were as good as those of the liner obtained in Example 1.

EXAMPLES 9 TO 11

Aqueous dispersions of varying viscosities were prepared by varying the solids concentration of an aqueous dispersion of an olefin resin composition consisting of 95 parts of ethylene/vinyl acetate (19 wt%) copolymer (density 0.94, [$\eta$] 0.55, M.I. 150) and 5 parts of maleic anhydride-grafted polyethylene (acid value 55, [$\eta$] 0.1, melting point 120°) and adding crosslinked polyacrylic acid as a thickener. Further, 0.5 part by weight of p,p'-oxybis benzene sulfonyl hydrazide (decomposition temperature about 160° C.), and 0.5 part by weight of azodicarbonamide as a blowing agent and 0.01 part of carbon black as a pigment were added per 100 parts by weight of the resin solids.

obtained firmly adhering to the cap shell. The cap was mounted on a glass bottle containing water at 70° C. under a sealing load of 50 kg, and allowed to stand for 1 month at room temperature. The degree of vacuum of each bottle was then measured, and found to be more than 20 cm Hg. Thus, the sealant properties of the cap liners were good. The results are shown in Table 3.

Table 3

| Ex. | Aqueous dispersion Solids concentration (wt. %) | Viscosity (cps) | Type of cap | Hardness (degree) | Density (g/cc) | Sealing Property |
|---|---|---|---|---|---|---|
| 9 | 40 | 500 | Tear-off cap | 55 | 0.45 | Good |
| 10 | 45 | 1500 | Tear-off cap | 60 | 0.50 | Good |
| 11 | 50 | 8000 | Screw cap | 60 | 0.50 | Good |

EXAMPLE 12

An aqueous dispersion consisting of 47.5 parts by weight of an ethylene/vinyl acetate (19% by weight) copolymer (melt index 150 g/10 min. [$\eta$] 0.55, density 0.94), 45.0 parts by weight of an ethylene/butene-1 copolymer (melt index 10 g/10 min. [$\eta$] 0.9, density 0.88), 7.5 parts by weight of maleic anhydride-grafted polyethylene (acid value 55; intrinsic viscosity 0.1; melting point 120° C.), and 5 parts by weight of talc (solids concentration 50% by weight; viscosity 7.000 centipoises) was poured in an amount of 0.8 g onto the periphery of a screw cap made of tin-plated steel with a diameter of 40 mm in an annular form (because of the high viscosity of the aqueous dispersion, it did not spread over the entire inner bottom of the cap). It was first heated for 30 minutes in an oven at 70° C., and then heated for 2 minutes by an infrared heater at 190° C. The resulting annular liner was transparent and had a density of 0.90 and a hardness of 70. It adhered firmly to the screw cap, and had good sealing properties.

EXAMPLES 13 AND 14

A predetermined amount of an aqueous dispersion having the same resin composition as set forth in Example 9-11 (solids concentration 49%, viscosity 1500 centipoises) with or without azodicarbonamide as a blowing agent was uniformly filled into the inside of a crown cap, and heated for 30 minutes in an oven at 80° C., and further for 2 minutes by an infrared heater at 230° C. Immediately then, a Teflon former having a circular groove at its surface was urged against the aqueous dispersion applied. It was then cooled with water, and the former was removed. The resulting liner contained the resin gathered in an annular form at a portion to be contacted with the mouth portion (thick portion) of a container, and had tight sealing properties.

Table 4

|  | Example 13 | Example 14 |
| --- | --- | --- |
| Amount (g) of the aqueous dispersion | 0.6 g | 0.4 g |
| Amount of the blowing agent (parts per 100 parts by weight of the solids) | 0 | 0.5 |
| Density of the liner | 0.92 | 0.70 |
| Hardness of the liner | 96 | 82 |

EXAMPLES 15 AND 16

An aqueous dispersion (solids concentration 49% by weight, viscosity 2200 centipoises) consisting of 90 parts by weight of an ethylene/vinyl acetate (6%) copolymer (density 0.92, [$\eta$] 0.6, MI 70) and 10 parts by weight of maleic anhydride-modified polyethylene was prepared, and 0.3 part, per 100 parts by weight of the resin solids, of each of the additives shown in Table 5 was added.

0.8 g of the resulting mixture was filled uniformly into the inside of an aluminum pilfer-proof cap (28 mm in diameter), and heated first for 5 minutes by an infrared heater in an atmosphere held at 120° C., and then for 1.5 minutes by an infrared heater in an atmosphere held at 230° C. The films adhering to the inner bottom surface of the cap formed a non-cellular transparent liner having a smooth surface. The properties of the films are shown in Table 5.

Table 5

| Example | 15 | 16 |
| --- | --- | --- |
| Additive | Polyethylene wax (slip agent) | Fine powder of polypropylene |
| Hardness of the film | 92 | 92 |
| Density of the film | 0.92 | 0.92 |

The cap opening torque value used in this test was about 15 kg.cm in all cases, which was a suitable value.

Caps having these liners were mounted on bottles using a sealing machine, and subjected to various sealing performance tests.

Water Leakage Test

Each of the lined caps was mounted on a bottle containing a predetermined amount of water at 20° C., and allowed to stand for 24 hours in an atmosphere at 50° C. No leakage of water was observed.

Continued Pressure Reduction Resistance Test

Glass bottles (110 cc) were each charged with hot water at more than 95° C. to the full, and the lined cap was mounted on each of the bottles. The bottles were stored for 3 months in an atmosphere held at 2° C., room temperature, and 40° C., respectively. Then, the degree of vacuum inside each bottle was measured, and found to be more than 20 cmHg in all cases. This shows that the liners had tight sealing properties.

The cap opening torque value of each of the test bottles used in this test was about 15 kg.cm in either case, which was a suitable value.

Continued Pressure Resistance Test

Glass bottles (110 cc) were each filled with 400% by volume of carbon dioxide gas, and the lined cap was mounted on each of the bottles. The bottles were dipped for 1 hour in a warm bath at 65° C., and examined for gas leakage. No leakage was observed.

In these Examples, two kinds of additives were used in order to eliminate the defect that in the absence of the additives, the cap opening torque would become as high as 25 kg.cm to cause difficulty of opening the cap. The cap opening torque was found to be 15 kg.cm in all of these Examples, and this shows that the torque is suitable and sufficiently feasible for practical purposes.

What we claim is:

1. A process for lining container caps, which comprises applying a dispersion in an aqueous medium of an olefin resin which is a mixture of (1) a resin selected from the group consisting of polyethylene, an ethylene/vinyl acetate copolymer, an ethylene/propylene copolymer, an ethylene/butene-1 copolymer, a propylene/butene-1 copolymer, and mixtures of at least two of said polymers, and (2) a modified product of said resin (1) which is a graft copolymer obtained by grafting an aliphatic dicarboxylic acid or its anhydride to said resin (1) to the inner bottom surface of a cap shell, subjecting the aqueous dispersion applied to a first-step heat treatment at a temperature below the thermo-forming temperature of the olefin resin, and then subjecting it to a second-step heat treatment at a temperature not lower than the thermo-forming temperature of the resin but below the heat decomposition temperature of the resin.

2. The process of claim 1 wherein the amount of the modified olefin resin is about 1 to about 50 parts by weight per 100 parts by weight of the mixture.

3. The process of claim 1 wherein the aqueous dispersion of the olefin resin has a viscosity, as measured by a Brookfield type viscometer, of about 10 to about 100,000 centipoises.

4. The process of claim 1 wherein the first-step heat treatment is carried out until at least about 90% by weight of the aqueous medium in the aqueous dispersion is removed.

5. The process of claim 1 wherein the aqueous medium is water, or a mixture of water and an organic solvent selected from the group consisting of alcohols, ethers and ketones.

6. The process of claim 1 wherein the modified olefin resin (2) is a graft copolymer obtained by grafting an aliphatic dicarboxylic acid selected from the group consisting of maleic acid, fumaric acid, mesaconic acid, citraconic acid and itaconic acid or the anhydride of any of these dicarboxylic acids to said resin (1).

7. The process of claim 8 wherein the dicarboxylic acid is maleic acid or its anhydride.

8. The process of claim 9 wherein the maleic acid or its anhydride is grafted to polyethylene.

9. The process of claim 1 wherein the modified resin (2) is maleic anhydride-grafted polyethylene.

* * * * *